Nov. 11, 1952 W. C. JACKSON 2,617,662
AUTOMOBILE FENDER FLAP AND SUPPORTING CLAMP
Filed Oct. 11, 1951 5 Sheets-Sheet 1
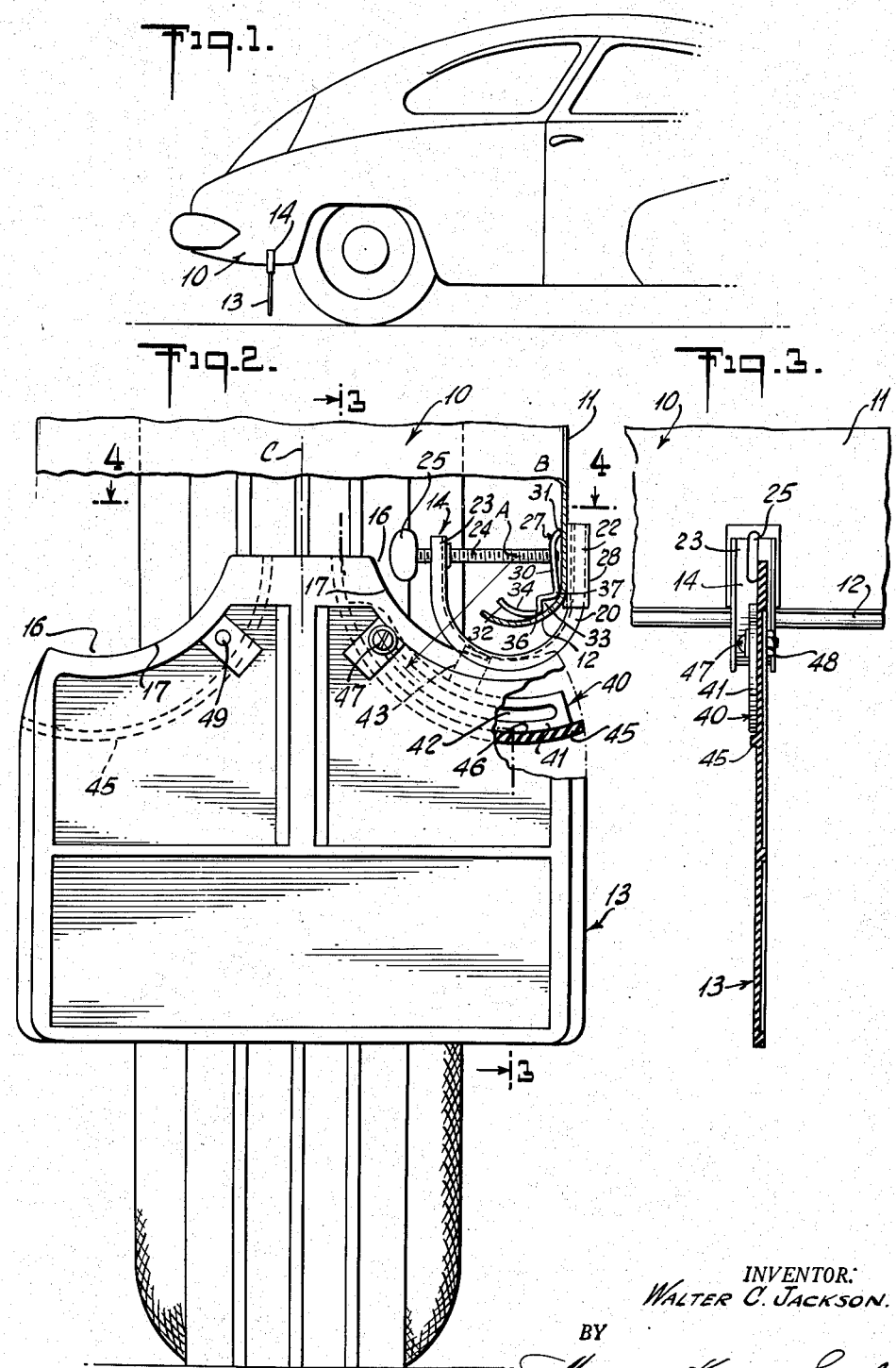
INVENTOR:
WALTER C. JACKSON.
BY
Morrison, Kennedy & Campbell
ATTORNEYS:

Nov. 11, 1952          W. C. JACKSON          2,617,662
AUTOMOBILE FENDER FLAP AND SUPPORTING CLAMP
Filed Oct. 11, 1951          5 Sheets-Sheet 2
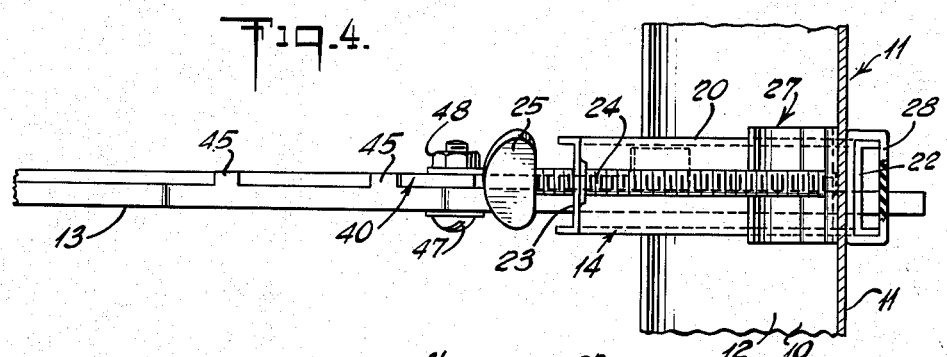
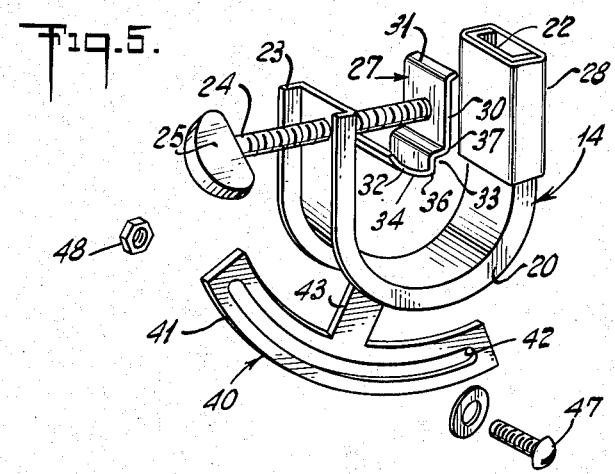
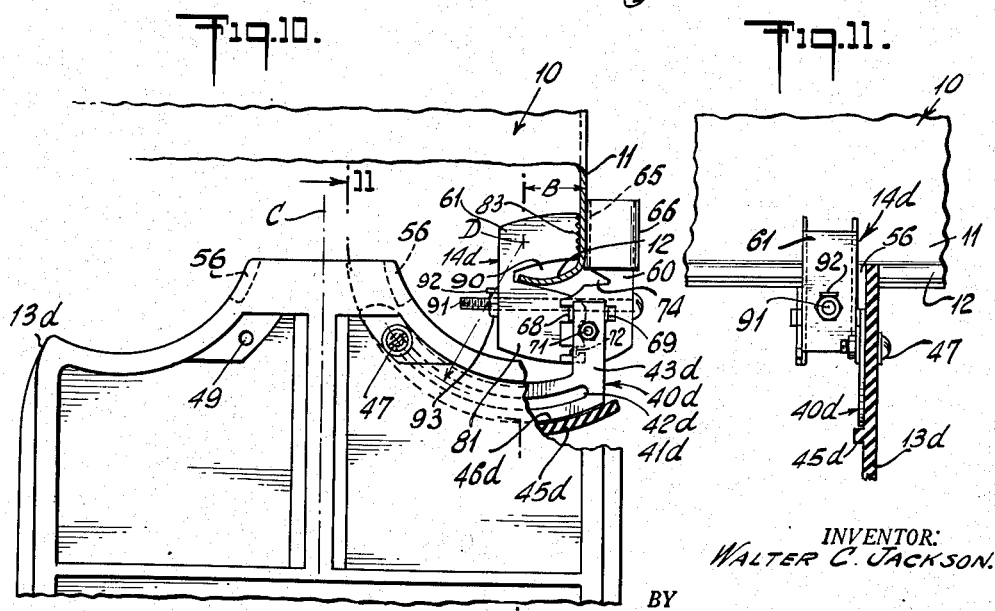
INVENTOR:
WALTER C. JACKSON.
BY
Harrison, Kennedy & Campbell
ATTORNEYS.

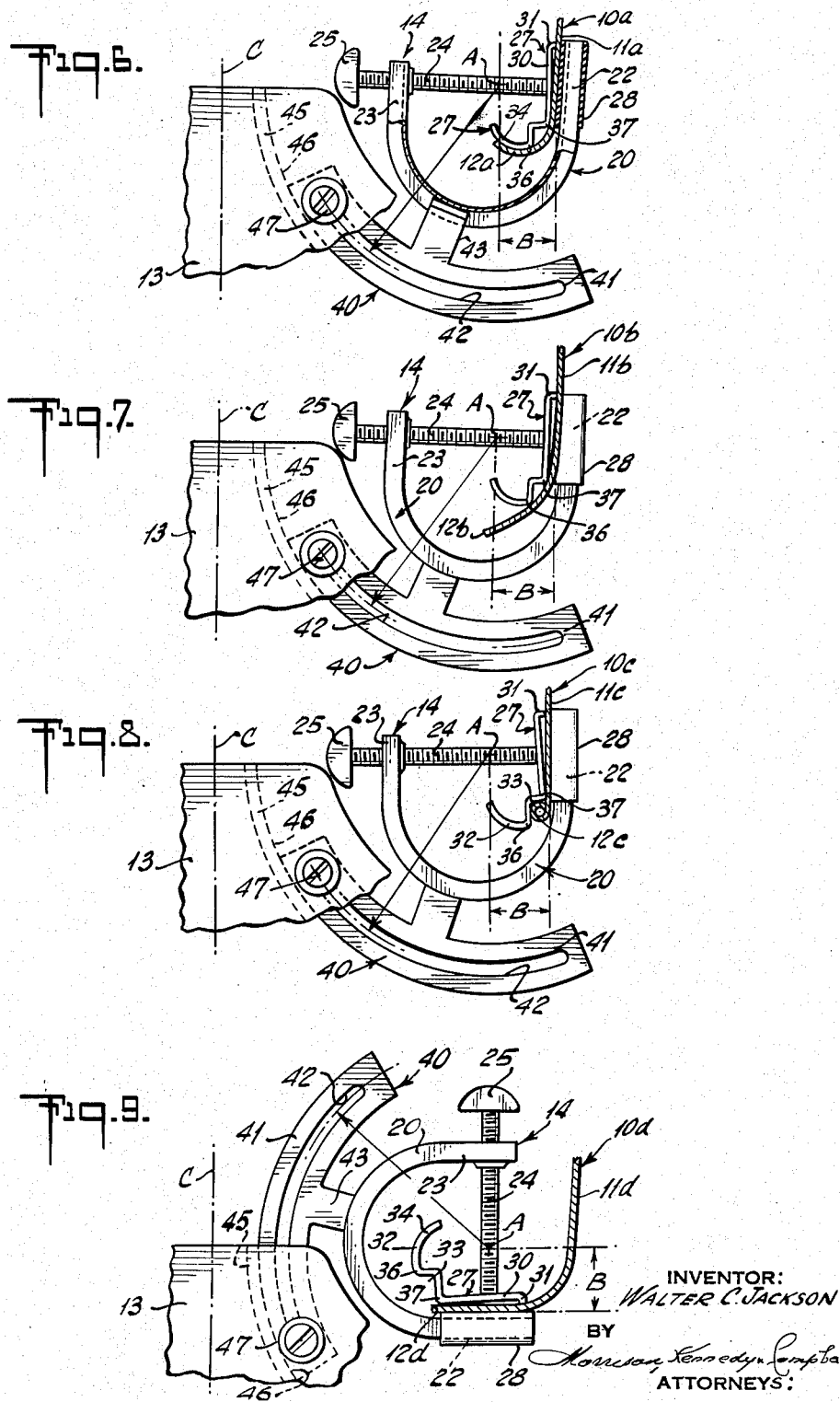

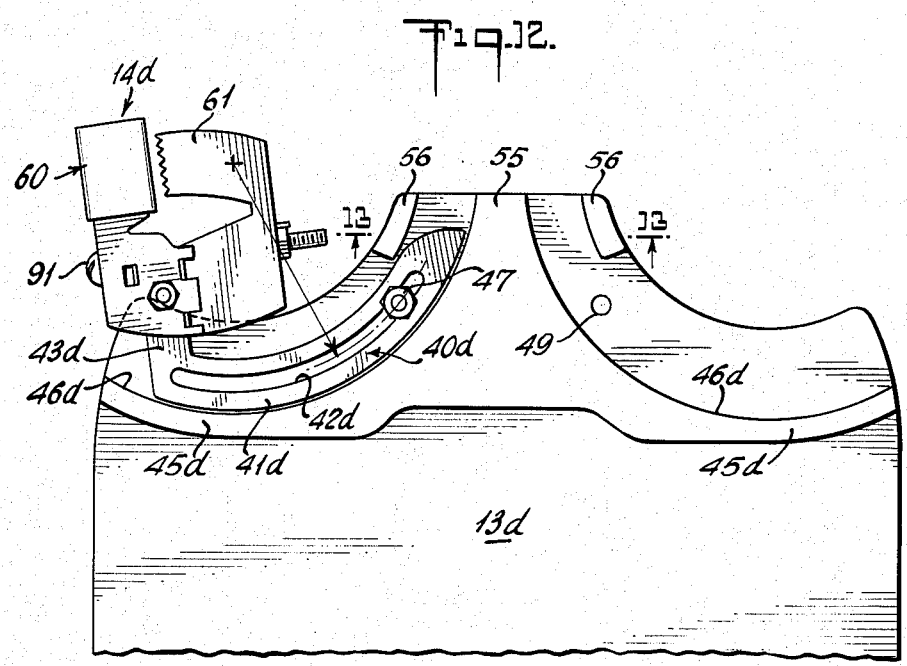
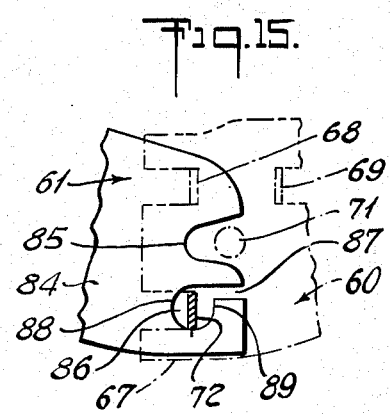

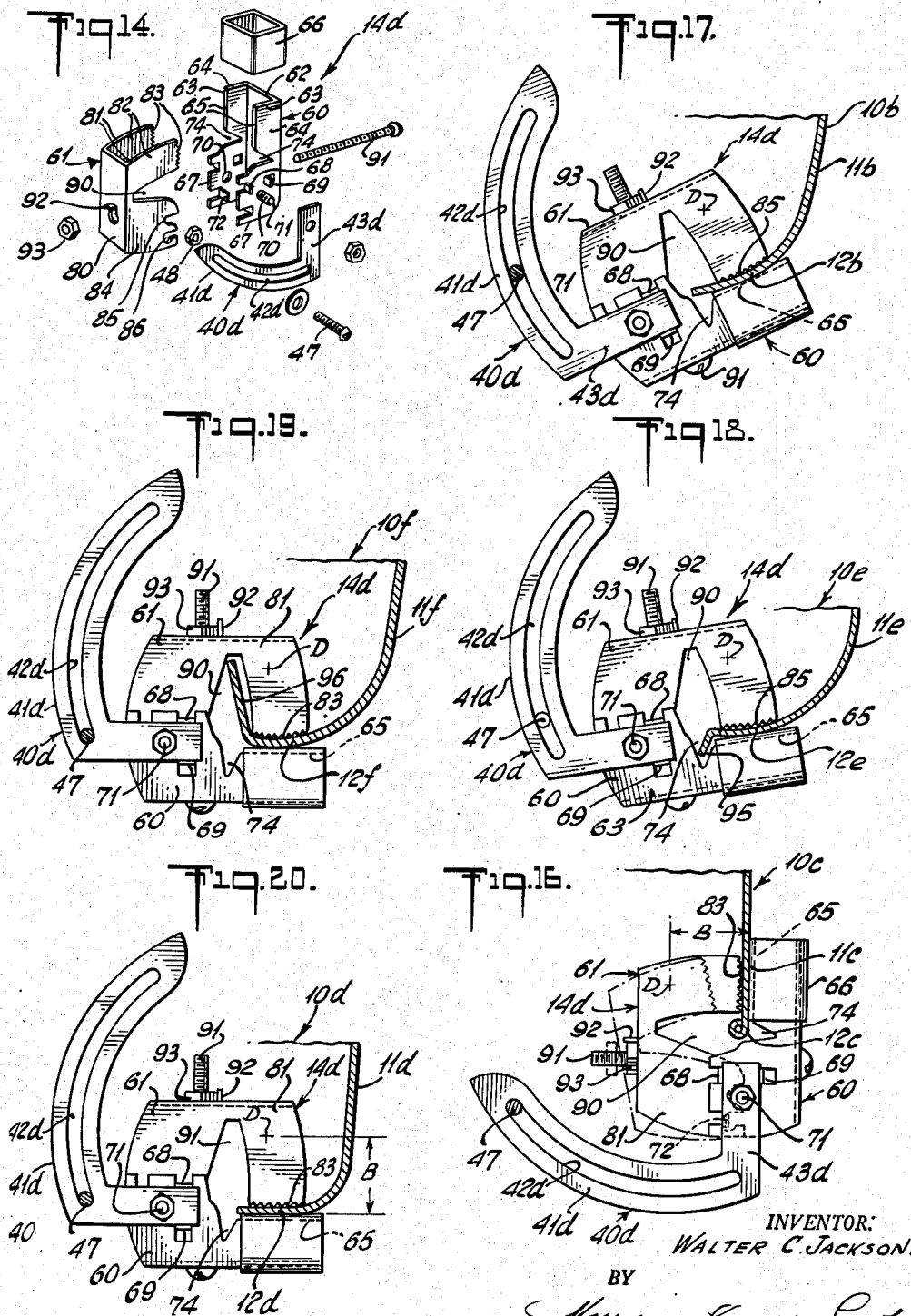

Patented Nov. 11, 1952

2,617,662

UNITED STATES PATENT OFFICE 2,617,662

AUTOMOBILE FENDER FLAP AND SUPPORTING CLAMP

Walter C. Jackson, Mountainside, N. J., assignor to Tingley Reliance Rubber Corporation, a corporation of New Jersey Application October 11, 1951, Serial No. 250,938

14 Claims. (Cl. 280—154.5)

The present invention relates to automobile fender flaps and to supporting clamps therefor and, more particularly, to that type of fender flap and supporting clamp adapted to be attached to the fender of an automobile to protect the sides of the fender and the back or front of the car from mud, gravel, tar and oil.

At the present time, the rear ends of the rear fenders of popular makes of cars follow one general design pattern and the front ends of the front fenders follow a similar design pattern. These fenders in one group all have a substantially vertical side wall disposed in a plane which extends fore-and-aft along the car and inwardly turned flanges or ribs differing in specific design in accordance with three or four general patterns. For example, in some specific designs, the flange is in the form of a narrow rim or in the form of a bead, while in others it may be wide and have different degrees of general inclination and different degrees of curvature.

Fender flap supporting clamps have been proposed of universal construction for attachment to the side wall of inward flange of a fender of any one of the several different standard designs. Such clamps have been adjustably secured to one end of a long supporting arm, the other end being adjustably secured to the center section of the fender flap. The arm is designed to be adjusted with respect to the fender flap to locate the flap correctly with respect to the wheels and the road surface.

Among the objects of the present invention are to provide a new and improved supporting clamp device for an automobile fender flap, which is free from long arm attachments to the flap, which can be secured in adjusted position to a fender flap more stably than is possible with a clamp device having a long supporting arm, and which can be adjusted for attachment either to the side wall of the fender in some standard types of fenders or to the inturned flange in other type or types, while automatically maintaining a positional relationship between the clamp and the fender flap assuring proper angularity, elevation and horizontal location of the fender flap with respect to the wheels and road surface.

Another object of the present invention is to provide a fender supporting device having a fender flap clamp of new and improved design adapted to be easily attached to a comparatively large variety of standard fenders.

Various other objects will be apparent from the following description and from the accompanying drawings, in which:

Fig. 1 is a side elevation of a rear portion of an automobile, showing a form of improved clamp and flap attached to a rear fender;

Fig. 2 is an enlarged vertical view through a portion of an automobile fender, just rearwardly of the right rear wheel, showing the improved clamp attached thereto and a fender flap supported thereby;

Fig. 3 is a vertical section taken on lines 3—3 of Fig. 2;

Fig. 4 is a horizontal section taken on lines 4—4 of Fig. 2;

Fig. 5 is an exploded view in perspective of one form of the improved clamp;

Figs. 6, 7, 8, and 9 are side elevational views of the clamp showing its attachment to automobile fenders of different designs;

Fig. 10 is a vertical view through a portion of an automobile fender, just rearwardly of the right rear wheel, showing another form of improved clamp attached thereto and a fender flap in front view supported thereby;

Fig. 11 is a vertical section taken on lines 11—11 of Fig. 10;

Fig. 12 is a rear view of the fender flap shown in Fig. 10, and of the alternative form of improved clamp attached thereto;

Fig. 13 is a horizontal section of the fender flap taken on lines 13—13 of Fig. 12;

Fig. 14 is an exploded view in perspective of the modified form of clamp shown in Fig. 10;

Fig. 15 is a front elevation partly in section of a detail of the improved clamp shown in Fig. 10; and Figs. 16, 17, 18, 19 and 20 are side elevational views of the modified form of clamp of Fig. 10, showing its attachment to automobile fenders of different designs.

Referring to Figs. 1, 2 and 3 of the drawings, there is shown a conventional automobile having a rear fender 10, the rear section of the fender beyond the corresponding right rear wheel having an upstanding side wall section 11 and an inturned flange 12 along the lower edge. The clamp of the present invention is shown applied to this rear fender on one side of the automobile, but it must be understood that it may also be applied to the front fender and that a similar clamp is employed for the fender or fenders on the other side of the automobile.

A fender flap 13 is adapted to be suspended from the fender 10 through a clamp 14 (Figs. 1-9), attachable to the side wall section 11 and to the inturned flange 12 of this fender, in a manner to be described.

The fender flap 13 is desirably of generally rectangular form and made of suitable resilient material, such as rubber, and has its two upper corners provided with recesses 16 with curved edges 17 to clear the lower edges of the fender 10 and to permit said fender flap to be located in proper position with respect to the tires, as shown in Fig. 2. Two similar recesses 16 are provided in each flap 13, in order to permit one flap to be used interchangeably for either the left or the right side of the car.

The clamp 14 per se shown in Figs. 1-9 is similar to that shown described and claimed in copending application Serial No. 117,332, filed July 26, 1951, and comprises a U-shaped frame 20, one leg 22 of which serves as a fixed jaw to bear against the finished outside face of the fender 10 in attached position of the clamp, the other leg 23 serving as a support for a screw 24 threaded therein and terminating at its outer end in a thumb piece 25. At its inner end, the screw 24 pivotally carries a jaw piece 27, adapted to bear against the unfinished inside face of the fender 10 in opposition to said leg or jaw 22. The pivotal connection between the screw 24 and the jaw piece 27 is such as to permit said jaw piece to rotate about said screw and affords enough lost motion to permit limited rocking of said jaw piece with respect to a plane at right angles to the axis of said screw, for the purpose later to appear.

The fixed leg or jaw 22 is desirably covered with some cushioning material to protect the finished face of the fender contacted thereby from being scratched or marred. To that end, the sleeve 28 of resilient or yieldable material, such as rubber, is fitted snugly or tightly over this jaw 22.

The movable jaw piece 27 is shaped to adapt itself conformably to fenders of different designs and, for that purpose, it is in the form of a rectangular plate bent to define a main clamping body 30, a narrow gripping flange 31 at one end turned in one direction, and a lateral clamping foot extension 32 at the other end turned generally in the opposite direction. This clamping foot extension 32 has an inward offset or depression 33 forming a substantially rectangular recess for receiving the bead edge of a fender in certain types of fenders, as will hereinafter be more fully described. The depression 33 defines an outer curved clamping section 34, a bend or projection 36 between the clamping section 34 and the depression 33, and a bend or heel 37 between the depression 33 and the clamping body 30.

As an important feature of the present invention, instead of adjustably connecting the clamp 14 to one end of a long arm and adjustably connecting the other end of said arm to the midsection of the fender flap 13, as in the construction of the aforementioned copending application, the clamp is rigidly secured to a bracket 40, which forms a compact unit with the clamp and which is adjustably secured to the side of the fender flap 13 nearest the fender. This bracket 40 and the supporting means therefor on the fender flap 13 are such as to automatically maintain the fender flap in proper centered position with respect to the car wheel and at proper elevation with respect to the road surface, as the clamp 14 is adjusted in relation to the fender flap to accommodate fenders of different standard makes. To that end, the bracket 40 is substantially T-shaped in the general form of a flat sector, and has one cross leg 41 in the form of an arc with an elongated arcuate slot 42 extending therealong, and a short leg or stem 43 extending radially from its midsection and rigidly secured to the base of the U-frame 20 of the clamp 14, as for example by welding or riveting.

The bracket 40 is supported on the fender flap 13 for guided adjusting movement thereon. For that purpose, the fender flap 13 on one face near the arcuate recess 16 (Figs. 2 and 3) has an arcuate rib 45, extending generally along the curved corner recess edge 17 of the fender flap and presenting a seat 46 for the arcuate bracket leg 41. The rib 45 may be either on the inner rear face of the fender flap 13 or on the outer front face, but to afford better appearance, this rib is preferably on the inner face. The seat 46 on this rib 45 has a radius the same as that of the outer edge of the arcuate bracket leg 41, to afford conforming slide contact therebetween, and is spaced a sufficient distance from the curved corner recess edge 17 of the fender flap 13 to define a fender flap section between said rib seat and said recess edge wider than the width of the arcuate bracket leg 1.

For securing the bracket 40 to the fender flap 13 in adjusted position, there is provided a bolt 47 (Figs. 2 and 3) passing through the bracket slot 42 and through a hole 49 in said fender flap. By loosening a nut 48 on this bolt 47, the bracket 40 may be slid along the rib seat 46 to bring the clamp 14 into any angular position desired with respect to the fender flap 13.

The clamp 14 and the bracket leg 41 are arranged so that, in position for attachment to the side wall of a standard fender, the U-shaped clamp frame 20 is in upright extreme position shown in Figs. 2, 6, 7 and 8 with its legs 22 and 23 extending upwardly or substantially vertically; and in position for attachment to the inturned flange of a standard fender, this clamp frame is in extreme reclining position shown in Fig. 9, with its legs 22 and 23 extending substantially horizontally. To limit the clamp 14 to the two extreme positions described, the bracket slot 42 is about 90° long and the bolt 47 is positioned to engage the ends of this slot in these two positions.

The bracket 40 (Figs. 2 and 3) and the rib support 45 therefor on the fender flap 13 are designed so that the clamp 14 may be attached to fenders of different makes, while maintaining the fender flap in proper centered and elevational position with respect to the adjacent wheel. The side walls of fenders of different standard makes in one general group are at substantially the same distance from the center plane of the adjacent wheel, so that the fender flap remains at the same centered position and at the same elevation, when the clamp 14 is attached to any one of said side walls. Assuming that a standard car of this group, having a fender with little or no inturned flange or an inturned flange not easily adapted for direct attachment of a clamp thereto, as shown in Figs. 2, 6, 7 or 8, is superposed upon another standard car of this group, with a fender having an inturned flange of substantial width and curvature permitting direct attachment of a clamp thereto, as shown in Fig. 9, and assuming that these cars are superposed with the center planes of their side wheels adjacent to said fenders coinciding, then the inturned flange of the fender of said other car will be located below and on the inner side of the clamp engaging section of the side wall of the fender of the first car, and the hypothetical horizontal distance between the center of the part of the inturned flange of the fender of said other car adaptable for clamp attachment and the vertical plane of the side wall of the fender of the first car will be equal to the hypothetical vertical distance between said flange part and the horizontal plane passing through the center of the part of said side wall adaptable for clamp attachment. For that reason, the arcuate support for the clamp 14 is such as to cause the fender engaging section 28 of the clamp 14 to swing from extreme position shown in Fig. 6, in which it clampingly engages the side wall of a standard fender, downwardly and inwardly towards the adjacent wheel into the other extreme position shown in Fig. 9, to engage clampingly the inturned flange of another standard fender. This permits the clamp 14 to be attached to the inturned flange of a standard fender without changing the centered or elevational position of the fender flap with respect to the adjacent wheel, assuming of course that the radial center A of the bracket slot 42 is properly located in position to be described.

To cause the clamp 14 to swing for adjustment from one extreme position shown in Figs. 6–8 to the other extreme position shown in Fig. 9, without changing the position of the fender flap with respect to the wheel or the road surface, the radial center A of the bracket slot 42 is located on the inner side of the fixed jaw or leg 22 of the clamp frame 20 in extreme position of said frame shown in Figs. 6, 7 and 8, and lies on or close to the axis of the clamp screw 24 in said position of the frame. The distance B between this radial center A and the clamping face of the resilient sleeve 28 is equal substantially to the hypothetical distances between the side wall and inturned flange of the fenders of the superposed standard cars indicated above. Therefore, in either extreme clamping position of the clamp 14 shown in Figs. 6, 7 and 8 and in Fig. 9, the center A of adjusting rotation of the clamp 14 will always lie on or be close to the axis of the clamp screw 24, and the clamping face of the resilient sleeve 28 will swing 90° from one extreme clamping position to another, without changing the position of the fender flap with respect to the adjacent wheel.

Figs. 2–4 show the manner in which the clamp 14 and fender flap 13 can be attached to and supported from one standard type of fender 10. In this type, the side wall section 11 of the fender is vertical and the inturned flange 12 is of substantial width and of wide curvature. For this type of fender, the U-frame 20 is set in upright position to receive the lower edge portion of the fender and the thumb screw 24 is turned until the side wall fender section 11 is firmly clamped between the fixed jaw or leg 22 and the movable jaw 27. In this position, the fixed rubber-covered jaw 22 will engage the outer surface of the vertical side wall section 11 and the movable jaw 27 will be so inclined that its flange 31 (Fig. 2) and heel 37 will engage the inner surface of said side wall fender section, while the bend or projection 36 of said movable jaw will strongly press against the inner surface of the fender flange, thereby insuring firm anchorage of the movable jaw 27. As the screw 24 is tightened, the jaw 27 is permitted to tilt with respect to a plane at right angles to the axis of the screw 24 to assume thereby automatically the clamping position described.

In clamping position shown in Fig. 2, the center plane C of the fender flap 13 will coincide with the center plane of the adjacent wheel, and the flap will be at the proper elevation.

Fig. 6 shows the adaptation of the clamp 14 to a fender 10a, in which the side wall section 11a is substantially vertical and in which the inturned flange 12a along its lower edge is comparatively narrow and has a curvature corresponding to the curvature of the outer clamping section 34 of the movable jaw 27. For this type of fender, the U-frame 20 is set in upright position with the lower section of the fender extending into said frame and with the side wall section 11a located between the clamp jaws 22 and 27. In this instance, the movable jaw 27 will have its gripping flange 31 and its bend or heel 37 firmly pressed against the inner surface of the side wall section 11a, while the outer curved clamping section 34 of the jaw 27 will be firmly and conformably seated against the inturned flange 12a of the fender.

Here again, in clamped position shown in Fig. 6, the center plane C of the fender flap 13 will coincide with the center plane of the adjacent wheel and the fender flap will be at the same proper elevation.

Fig. 7 shows the adaptation of the clamp 14 to a fender 10b, in which the side wall section 11b is substantially vertical and in which the inturned flange 12b along its lower edge is comparatively wide but it is still narrow enough to extend into the U-frame 20 when in upright position, even though it has a wide curvature and extends generally obliquely downwardly from the lower edge of said side wall section. For this type of fender construction, the U-frame 20 is also located in upright position, with the lower section of the fender extending into said frame, and with the side wall section 11b located between the clamp jaws 22 and 27. In this instance, the movable jaw 27 will have its gripping flange 31 and its bend or heel 37 firmly pressed against the inner surface of the side wall section 11b, while the bend or projection 36 of said jaw will be firmly pressed against the inner surface of the inturned flange 12b of the fender.

When attached to the fender construction 10b of Fig. 7, the fender flap 13 will still remain in centered position with respect to the adjacent wheel and at the same elevation with respect to the road surface.

Fig. 8 shows the adaptation of the clamp 14 to a fender 10c in which the side wall section 11c is substantially vertical and in which the inturned flange 12c along its lower edge is in the form of a rolled bead. In this case, the U-frame 20 is set in upright position with the lower section of the fender extending into said frame and the side wall section 11c located between the clamp jaws 22 and 27. In this instance, the movable jaw 27 will have its gripping flange 31 and its bend or heel 37 firmly pressed against the inner surface of the side wall fender section 11c, while the bead 12c of the fender will extend snugly and firmly into the recess 33 of the jaw foot 32.

Here again, in the fender construction 10c of Fig. 8, the fender flap 13 will remain in centered position with respect to the adjacent wheel and at the same elevation with respect to the road surface.

In the four types of standard fenders shown in Figs. 2, 6, 7 and 8, the side walls of the fenders are at the same distance from the adjacent wheel, and their clamp attaching parts are at substantially the same elevation, so that the clamp 14 can be attached to any one of said fenders, and in each case, the proper centered position of the fender flap 13 and its proper elevation will be assured.

Fig. 9 shows the adaptation of the clamp 14 to a fender 10d, in which the side wall section 11d is not necessarily vertical, and in which the inturned flange 12d along its lower edge is so wide, that it cannot fit comfortably within the clamp frame 20 when in upright position. In this type of fender, the flange 12d extends almost horizontally and hence the clamp frame 20 is positioned on its side, rather than upright, to locate the jaws 22 and 27 on opposite sides of the flange. In this instance, the movable jaw 27 will have its gripping flange 31 and its bend or heel 37 firmly pressed against the inner surface of the fender edge flange 12d.

In adjusting the clamp 14 from one extreme position shown in Figs. 6, 7 and 8 into the other extreme position for attachment to the fender 10d shown in Fig. 9, the bolt 47 is loosened and the clamp rotated clockwise, while the arcuate bracket leg 41 rides along the arcuate rib 45 on the fender flap 13. During this manipulation, the clamp jaw 27 will swing about the center A downwardly and inwardly, until the clamp 14 reaches the extreme position shown in Fig. 9, in which the U-frame 20 is positioned on its side. In this position, the clamp jaw 27 will be in position to engage the fender flange 12d. As already described, the adjusting support for the clamp 14 is designed, so that when the clamp is angularly set with respect to the fender flap to engage the fender flange 12d and is clamped to said flange as shown in Fig. 9, the fender flap 13 will assume a centered position with respect to the wheel and the same proper elevation with respect to the road surface.

It is seen, therefore, that with the construction of Figs. 2–9, only one adjustment of the clamp 14 with respect to the fender flap 13 need be made to accommodate the particular standard fender contemplated. Once this adjustment has been made, the installer is assured that when attached to the fender, the fender flap 13 will assume its proper place with respect to the wheel without further changes or adjustments.

The fender flap 13 is provided with two similar arcuate ribs 45 (Fig. 2) symmetrically arranged on opposite sides thereof and the sides of the fender flap are provided with similar holes 49 above said ribs to receive the bolts 47, so that the same fender flap may be used either for the left or right hand side of the car. The clamp 14 is designed for interchangeable use either on the left or right hand side of the fender flap, and when the fender flap is to be used for the left hand side of the car, the clamp 14 is mounted on the left side of the fender flap with its arcuate supporting bracket leg 41 seated upon the corresponding rib 45.

Although the clamp 14 is shown in upright positions and in reclining positions, the clamp 14 may be adjusted in intermediate positions to accommodate different types of fenders.

Figs. 10–20 show a modified form of clamp 14d having application to a larger variety of standard fenders and suitable for attachment to standard fenders when set not only in two extreme positions corresponding to those of clamp 14 in the construction of Figs. 2–9, but also in intermediate angular positions. The fender flap 13d used in connection with this modified form of clamp 14d may be similar to that shown in Figs. 2–9, except that the fender flop 13d has a raised intermediate portion 55 (Figs. 12 and 13) with opposite rib extensions 45d defining therewith rib seats 46d, and short ribs 56 at the upper edge of the fender flap 13d located opposite said seats respectively and serving to give more support and guidance to the arcuate bracket legs to be described.

For adjustably securing the clamp 14d to the fender flap 13d, the clamp is secured to a bracket 40d of flat plate generally L-shaped sector construction having one leg 41d in the form of an arc with an elongated slot 42d extending therealong as in the construction of Figs. 2–9, and a short leg or stem 43d extending radially from one end of said arcuate leg and rigidly secured to one jaw of the clamp, as will be described. This arcuate bracket leg 41d is adapted to seat conformably on the corresponding seat 46d (Figs. 10 and 12) of the fender flap 13d and is held in adjusted position by the bolt 47 passing through the bracket slot 42d and through the hole 49 on said fender flap.

The clamp 14d comprises a pair of opposed jaws 60 and 61 (Fig. 14), one jaw 60 being secured rigidly to the short bracket leg 43d in the manner to be described, the other jaw 61 being supported on said fixed jaw 60 for limited pivotal movement with respect thereto.

The fixed jaw 60 is U-shaped in cross-section and is preferably made from a sheet of metal by stamping to define a rear flat wall 62 (Fig. 14) and a pair of similar flat side walls 63 extending therealong at right angles thereto. The upper sections 64 of these side walls 63 present straight clamping edges 65 respectively parallel to the rear wall 62, and these edges are desirably covered with cushioning material by means of a sleeve 66 of resilient or yieldable material, such as rubber, fitted snugly or tightly over the upper fender clamping part of the jaw 60.

Each of the lower sections 67 of the side walls 63 of the jaw 60 has a pair of fingers 68 and 69 struck outwardly therefrom and spaced apart sufficiently to receive snugly therebetween the short bracket leg 43d, and also an opening 70 midway between the planes of these fingers to receive a short bolt 71 by which the jaw 60 may be rigidly secured to said bracket leg. Each of the lower side wall sections 67 also has a tab 72 struck inwardly therefrom and serving as a pivot support for the jaw 61, as will be more fully described.

The two sections 64 and 67 of each side wall 63 of the jaw 60 are separated by a substantially V-shaped recess 74 to receive the lower lip of a standard type of fender, as will be more fully described.

The jaw 61 is also U-shaped in cross-section and is preferably made from a sheet of metal by stamping to define a rear wall 80 and a pair of similar flat side walls 81 extending therealong at right angles thereto. The outside width of the jaw 61 is slightly less than the inside width of the jaw 60, to permit said jaw 61 to be inserted between and flanked by the side walls 63 of said jaw 60 and to be fitted therebetween with a snug slide fit permitting angular movement of the jaw 61 with respect to the jaw 60.

The upper sections 82 of the side walls 81 on the jaw 61 present serrated clamp edges 83 adapted to cooperate with the straight clamping padding edges 65 on the other jaw 60, and each of the lower sections 84 of the side walls 81 of said jaw 61 has a notch 85 to clear the head of the bolt 71 on the jaw 60 and a notch 86 with a catch conformation to receive and hold the pivot tab 72 on the jaw 60. This notch 86 (Figs. 14 and 15) has a narrow entry section 87 and a larger round catch section 88 defining a shoulder 89. The height of the narrow entry notch section 87 is slightly greater than the thickness of the pivot tabs 72 but smaller than the width of said tabs, while the height of the larger notch section 88 is slightly greater than the width of said tabs. For assembly, the two jaws 60 and 61 are set at right angles to each other and are moved relatively towards each other to cause the pivot tabs 72 to move edgewise through the narrow entry sections 87 of the notches 86 until they reach the larger sections 88 of the notches. The jaws 60 and 61 can then be turned relatively into position alongside of each other, with the pivot tabs 72 held in the larger sections 88 of the notches 86 as shown in Fig. 15. The jaws 60 and 61 are thereby held against separation and the jaw 61 is permitted to swing to a small extent about the pivot tab 72 on the jaw 60, limited inwardly by the engagement of the base of the notch 85 with the head of the bolt 71 and limited outwardly by the bolt 91 to be described. The two sections 82 and 84 of each side wall of the jaw 61 are separated by a deep substantially V-shaped recess 90 (Fig. 14) to receive the lower upstanding flange of a standard fender, as will be more fully described. The recesses 90 in the side walls 81 of the jaw 61 are disposed opposite to the recesses 74 in the side walls of the jaw 60, but are deeper, and for that reason the jaw 61 is deeper than the jaw 60.

For pressing the jaws 60 and 61 together with clamping pressure on the fender, there is provided the long bolt 91 passing through the rear walls 62 and 80 of the jaws 60 and 61. The hole through which the bolt 91 passes in the rear wall 80 of the jaw 61 is desirably elongated and the material from the extension of said hole is struck out from the plane of said rear wall to define a tab 92 adapted to engage the nut 93 of said bolt and hold it against turning.

The bracket leg 41d is similar in shape and curvature to the bracket leg 41 in the construction of Figs. 2–9, and the slot 42d therein has a radial center D located in relation to the jaws 60 and 61 to correspond to the position of the radial center A in relation to the jaws 22 and 27 in the construction of Figs. 2–9. For that purpose, the radial center D of the slot 42d is located on the inner side of the clamping edges 65 of the jaw 60 in extreme upright position of said edges shown in Fig. 16 and lies substantially along the horizontal center line of said edges in this extreme position. The distance between this radial center D and the resilient surface on the clamping jaw edges 65, in this upright extreme position of said edges, is equal to the distance B in the construction of Figs. 2–9. By means of this relationship, the clamp 14d may be swung with respect to the fender flap 13d for adjustment from one extreme position shown in Figs. 10, 11 and 16 to the other extreme position shown in Figs. 19 and 20 and from either extreme position into intermediate positions shown in Figs. 17 and 18, without changing the position of the fender flap with respect to the wheel or road surface, upon attachment of the clamp so adjusted to a standard fender.

Figs. 10 and 11 show the manner in which the clamp 14d and the fender flap 13d are attached to the vertical side wall section 11 of the standard fender 10 similar to that shown in Figs. 2–4. For this type of fender, the two jaws 60 and 61 are set in upright extreme position to receive between the clamp edges 65 and 83, the lower edge portion of the fender. While the jaws 60 and 61 are being set in position to engage the fender side wall section 11, the bolt 91 is loose on the jaw 61, and the jaw 61 is tilted about the pivot tab 72 on the jaw 60 to provide sufficient clearance between the jaws to receive freely this side wall section. The recesses 90 in the side walls 81 of the jaw 61 receive therein the inturned fender flange 12 of substantial width. When the jaws 60 and 61 are positioned properly with respect to the fender 10, the bolt 91 is tightened to clamp these jaws firmly upon the side wall section 11 of said fender. When so installed, the fender flap 13d will be centered with respect to the adjacent wheel and will be at proper elevation, as shown in Fig. 10.

The clamp 14d is also adapted to be attached to the fender 10a shown in Fig. 6, in the manner similar to that shown in Fig. 10, with the jaws 60 and 61 in upright extreme position clampingly engaging the side wall section 11a of said fender, and the inturned flange 12a extending into the recesses 90 of the side walls 81 of the jaw 61. In this position of the clamp 14d, the position of the fender flap 13d with respect to the adjacent wheel remains unchanged.

Fig. 16 shows the adaptation of the clamp 14d to the fender 10c similar to that shown in Fig. 8. In this application, the jaws 60 and 61 remain in extreme upright position, with the side wall fender section 11c located between the clamping jaw edges 65 and 83 and the bead 12c along the lower edge of the fender extending into the recesses 90 in the side walls 81 of the jaw 61.

Fig. 17 shows the adaptation of the clamp 14d to the fender 10b similar to that shown in Fig. 7. In this case, the inturned flange 12b along the lower edge of the fender is too wide and inclined too obliquely to permit the clamp 14d to be attached to the side wall section 11b of said fender with the jaws 60 and 61 in extreme upright position. However, the clamp 14d is admirably suited for attachment directly to this inclined flange 12b, while maintaining the fender flap 13d in proper centered position with respect to the adjacent wheels. Towards that end, the clamp 14d is angularly set on the fender flap 13d through its mounting bracket 40d and bolt 47, from upright extreme position shown in Fig. 16 to intermediate inclining position shown in Fig. 17. In this position, the clamping jaw edges 65 and 83 extend generally in the inclined direction of the fender flange 12b and are directly clamped firmly thereto through the bolt 91.

Due to the described location of the radial center D of the bracket slot 42d in relation to the fender flap 13d, the swing of the clamp 14d from upright extreme position shown in Fig. 16 clockwise to the intermediate position shown in Fig. 17 is attended with an inward downward movement of the clamping jaw edges 65 and 83 into position to correspond to the inward downward position of the fender flange 12b with respect to the side wall section 11b of the fender. The position of the fender flap 13d with respect to the adjacent wheel therefore remains substantially unchanged.

Fig. 18 shows the adaptation of the clamp 14d to a standard fender 10e now used on a "Mercury" and having a wide slightly inclined inturned flange 12e of wide radius terminating in a narrow downwardly inclined lip 95. In this case, the inturned flange 12e is too wide to permit the clamp 14d to be attached directly to the side wall section 11e of said fender with the jaws 60 and 61 in extreme upright position, and the slight inclination of said inturned flange prevents the clamp 14d to be directly attached to said inturned flange 12e with its jaws 60 and 61 extending on their sides substantially horizontally in the other extreme position. However, the clamp 14d can be conveniently attached by angularly setting the clamp on the fender flap from upright extreme position shown in Fig. 16 to intermediate inclined position shown in Fig. 18 clockwise beyond the position shown in Fig. 17. In this intermediate position, the clamping jaw edges 65 and 83 extend generally in the inclined direction of the fender flange 12e and are directly clamped firmly thereto through bolt 91, while the fender lip 95 extends into the recesses 74 in the side walls 63 of the jaw 60. Here again, the fender flap 13d will remain in properly centered position with respect to the adjacent wheel and at the right elevation.

Fig. 19 shows the application of the clamp 14d to a standard fender 10f now used on a "Studebaker" and having a wide inturned substantially horizontal flange 12f of wide radius and a wide upwardly inclined rim 96. Here again, the inturned flange 12f is too wide to permit the clamp 14d to be attached directly to the side wall section 11f of said fender with the jaws 60 and 61 in extreme upright position. However, the clamp 14d can be conveniently attached directly to the inturned fender flange 12f by setting the clamp in the other extreme position at 90° clockwise from the upright position shown in Figs. 10 and 16. In this other extreme position, the jaws 60 and 61 extend substantially horizontally with the clamping jaw edges 65 and 83 extending in the same direction and clamped firmly to the fender flange 12f through the bolt 91, while the fender rim 96 extends obliquely upwardly into the recesses 90 in the side walls 81 of the jaw 61.

Due to the described location of the radius center D of the bracket slot 42d in relation to the fender flap 13d, and the position of the inturned flange 12f of the fender 10f with respect to the clamping part of the side wall section of a fender of the general standard type shown in Figs. 10 and 16, the clamping jaw edges 65 and 83 will fall into position to clampingly engage said inturned fender flange, when the clamp 14d is set in the extreme horizontal position shown in Fig. 19 with respect to the fender flap, without changing the position of said flap with respect to the adjacent wheel.

Fig. 20 shows the manner in which the clamp 14d and the flap are attached to the horizontal inclined flange 12d of the standard fender 10d similar to that shown in Fig. 9. For this type of fender, the clamp 14d remains in the extreme position shown in Fig. 19, with the jaw edges 65 and 83 extending horizontally to engage clampingly the inturned flange 12d of the fender 10d, so that the position of the fender with respect to the adjacent wheel remains unchanged.

The clamp 14d is shown in the drawings attached to the right side of the fender flap 13d for use in connection with the right fender. If the clamp 14d is to be used in connection with the left fender, the bracket bolt 71 is removed, the bracket leg 43d is transferred from position between the fingers 68 and 69 on one side wall 63 of the jaw 60 to the position between the fingers 68 and 69 on the other side wall 63 of said jaw, and said bracket leg is secured in this new position by said bracket bolt. The clamp 14d can then be set on the left side of the fender flap 13d with its arcuate bracket leg 41d seated on the seat 46d on said side of the flap. In this relationship of the clamp 14d to the fender flap 13d, the clamp can be attached to the left fender.

In both forms of the invention shown, the brackets 40 and 40d are rigidly connected to the clamps 14 and 14d respectively and these brackets in turn are adjustably mounted on the fender flaps 13 and 13d respectively. However, as far as certain aspects of the invention are concerned, the brackets may be secured in fixed position on the fender flaps, and the clamps may be adjustably mounted on said brackets Also, in both forms of the invention, instead of providing the bracket legs 41 and 41d with elongated slots 42 and 42d respectively and mounting the bolts 47 in fixed position on the fender flaps 13 and 13d, as far as certain aspects of the invention are concerned, the fender flaps may have the elongated slots and the bolts 47 may be fixed with respect to the bracket legs. This latter construction however is less desirable than that shown in the drawings and described, because it detracts from the appearance of the fender flaps and provides openings in said fender flaps through which mud, dirt and oil may pass.

Furthermore, instead of providing an elongated slot in the bracket legs 41 and 41d or in the fender flaps 13 and 13d described, said legs or fender flaps may have a series of separate holes spaced in definite predetermined relationship to correspond to the different angular positions of the clamp 14 and 14d for the different standard makes of fenders.

While the invention has been shown and described with particular reference to a specific embodiment, it is to be understood that it is not to be limited thereto, but is to be construed broadly and restricted solely by the scope of the appended claims.

What is claimed is:

1. A device for supporting a fender flap from the fender of a car comprising a clamp adapted to be fastened to the fender, and means for adjustably attaching the clamp to the fender flap and comprising a member rigid with said clamp and designed to seat on a curved guide rigid with said fender flap for adjusting movement therealong, whereby said clamp can be adjusted angularly with respect to the fender flap for attachment to fenders of different standard makes.

2. A device for supporting a fender flap from the fender of a car comprising a clamp adapted to be fastened to the fender, a bracket secured to said clamp for adjustably attaching the clamp to the fender flap and comprising a leg curved to seat on a correspondingly curved guide on the fender flap and to permit movement of said leg along the flap guide, whereby said clamp can be adjusted angularly with respect to the fender flap for attachment to fenders of different standard makes, said bracket leg having a slot extending therealong, and a fastening member adapted to pass through said slot and through the fender flap for securing said bracket to the fender flap in adjusted position.

3. A device for supporting a fender flap from the fender of a car comprising a clamp adapted to be fastened to the fender and a bracket rigidly secured to said clamp for adjustably attaching the clamp to the fender flap and presenting an arcuate edge for slidable seating engagement with a correspondingly curved guide on the fender flap, said arcuate edge having a radial center located to cause said clamp to be adjusted about said center for attachment to fenders of different standard makes, while maintaining the fender flap in substantially the same positional relationship with respect to the adjacent wheel of the car.

4. A device for supporting a fender flap from the fender of a car comprising a clamp adapted to be fastened to the fender and including a fixed jaw and a jaw supported for movement towards and away from said fixed jaw, and a bracket for adjustably attaching the clamp to the fender flap and comprising an arcuate leg for slidable seating engagement with an arcuate guide on the fender flap and a leg extending radially from said arcuate leg and rigidly secured to said fixed jaw, said arcuate leg having an arcuate slot therealong for securing a fastening screw therethrough.

5. A device for supporting a fender flap from the fender of a car comprising a clamp adapted to be fastened to the fender and including a U-shaped frame having a pair of legs connected by a base, one of the legs of said frame defining a fixed clamping jaw, and a movable clamping jaw supported on said frame for movement with respect to and for clamping cooperation with said fixed jaw, and a bracket for adjustably attaching the clamp to the fender flap and comprising an arcuate leg for slidable seating engagement with an arcuate guide on the fender flap and a leg extending from said arcuate leg and rigidly secured to the base of said U-shaped frame, said arcuate leg having an arcuate slot therealong for receiving a fastening screw therethrough.

6. A device for supporting a fender flap from the fender of a car comprising a clamp adapted to be fastened to the fender and including a fixed clamping jaw and a movable clamping jaw supported on said fixed jaw for limited pivotal movement towards and away from said fixed jaw, and a clamping bolt securing said jaws together against separation and adapted to press said jaws towards each other for fender clamping action, and a bracket for adjustably attaching the clamp to the fender flap and comprising an arcuate leg for slidable seating engagement with an arcuate guide on the fender flap and a leg extending from said arcuate leg and rigidly secured to said fixed jaw, said arcuate leg having an arcuate slot therealong for receiving a fastening screw therethrough.

7. In combination, a clamp adapted to be attached to a fender, a fender flap having a curved guide along one face thereof, a bracket secured to said clamp and having a part engaging said guide for slide adjusting movement therealong, and means for securing said bracket to said fender flap in adjusted position.

8. In combination, a clamp adapted to be attached to a fender, a fender flap, a guide rigid with said flap and having an arcuate seat, and means for adjustably securing said clamp to said fender flap and comprising a member rigid with said clamp and presenting an arcuate edge conforming in curvature with the curvature of said seat, said edge slidably engaging said seat to permit adjustment of said clamp along said seat.

9. In combination, a clamp adapted to be attached to a fender, a fender flap of generally rectangular shape having an upper corner recessed to receive said clamp and having a curved guide along its face near said recessed corner inclined generally upwardly towards the vertical center line of said fender flap, a bracket rigidly secured to said clamp and presenting a curved edge conforming in curvature to that of said guide and slidably engaging said guide for adjustment of said clamp along said guide, and means for securing said bracket to said fender flap in adjusted position along said guide.

10. In combination, a clamp adapted to be attached to a fender, a fender flap of generally rectangular shape having an upper corner recessed to receive said clamp and to define an arcuate corner edge extending generally in a direction inclined upwardly and towards the vertical center line of said fender flap, said flap having a rib on its inner face defining an arcuate seat near said corner edge and extending generally therealong, a bracket rigidly secured to said clamp and presenting an arcuate edge conforming in curvature to that of said seat and supported on said seat for slidable adjustment of said clamp therealong, said bracket having an elongated arcuate slot near its edge concentric therewith, and a fastening screw passing through said bracket slot and through said fender flap.

11. A device for supporting a fender flap from the fender of a car comprising a clamp including a pair of opposed clamping jaws, each of said jaws being stamped from plate material into U-shaped cross-section, the side walls of said jaws terminating in confronting fender clamping edges, the side walls of one of said jaws being stamped to define a pair of fingers, means for forcing the jaws relatively into fender clamping position, a bracket having a part adapted to be attached to the fender flap and having a leg extending along the side wall of the jaw containing said fingers, said leg being held between said fingers, and means for fastening said bracket leg to said latter side jaw wall.

12. A device for supporting a fender flap from the fender of a car comprising a clamp including a pair of opposed clamping jaws each of said jaws being of plate construction and having a U-shaped cross-section, the side walls of one of said jaws near one end flanking the side walls of the other wall near said end in overlapping relationship, the side walls of said jaws near the other end terminating in confronting fender clamping edges, a pivot support for one of said jaws with respect to the other jaw at the overlapping sections of said jaws, screw means for forcing the jaws relatively towards each other towards fender clamping position, a bracket secured to one of said jaws, and means for securing said bracket to the fender flap, characterized in that the jaws are stamped of sheet metal into U-shaped cross-sectional form, the side walls of one of the jaws at the overlapping sections being stamped with pivot tabs respectively to form said pivot support, the side walls of the other jaw at said overlapping section being formed with notches to receive said tabs respectively.

13. A device for supporting a fender flap from the fender of a car comprising a clamp including a pair of opposed clamping jaws each of said jaws being of plate construction and having a U-shaped cross-section, the side walls of one of said jaws near one end flanking the side walls of the other wall near said end in overlapping relationship, the side walls of said jaws near the other end terminating in confronting fender clamping edges, a pivot support for one of said jaws with respect to the other jaw at the overlapping sections of said jaws, screw means for forcing the jaws relatively towards each other towards fender clamping position, a bracket secured to one of said jaws, and means for securing said bracket to the fender flap, characterized in that the jaws are stamped of sheet metal into U-shaped cross-sectional form, the side walls of one of the jaws at the overlapping sections being stamped with pivot tabs respectively to form said pivot support, the side walls of the other jaw at said overlapping section being formed with key notches to receive said tabs respectively, each of said key notches having an entry section wide enough to permit the corresponding pivot tab to pass therethrough edgewise but not wide enough to permit said pivot tab to pass therethrough facewise, each of said key notches also having at one end an enlarged section for receiving said pivot tab, large enough to permit said pivot tab to turn freely therein for pivot action, said enlarged section defining a catch shoulder preventing said pivot tab from emerging therefrom into the entry section of the notch except by the edgewise movement of said tab along said entry section.

14. A device for supporting a fender flap from the fender of a car comprising a clamp including a pair of opposed jaws, movable relatively towards and away from each other and defining clamping edges for engaging the opposite faces of a fender wall, said jaws being formed on their confronting sides with respective recesses opposite each other to receive the differently shaped lower edge sections of fenders of standard makes, one of said recesses being deeper than the other, said recesses being substantially V-shaped with the broader ends at the confronting jaw sides, a bracket rigidly secured to said fixed jaw, and means for securing said bracket to a fender flap and adjustable to permit said clamp to engage fenders of different standard makes.

WALTER C. JACKSON.

REFERENCES CITED

The following references are of record in the file of this patent:

UNITED STATES PATENTS

| Number | Name | Date |
|---|---|---|
| 1,358,159 | Kern | Nov. 9, 1920 |
| 2,084,087 | Jackson | June 15, 1937 |
| 2,585,397 | McCollum, Jr. | Feb. 12, 1952 |

FOREIGN PATENTS

| Number | Country | Date |
|---|---|---|
| 23,457 | Denmark | Aug. 21, 1918 |